April 26, 1932.  W. W. WHITE  1,855,504

BRAKE MEANS

Filed Nov. 10, 1924    4 Sheets-Sheet 1

Witnesses:
W. P. Kilroy
Harry R. L. White

Inventor:
William W. White

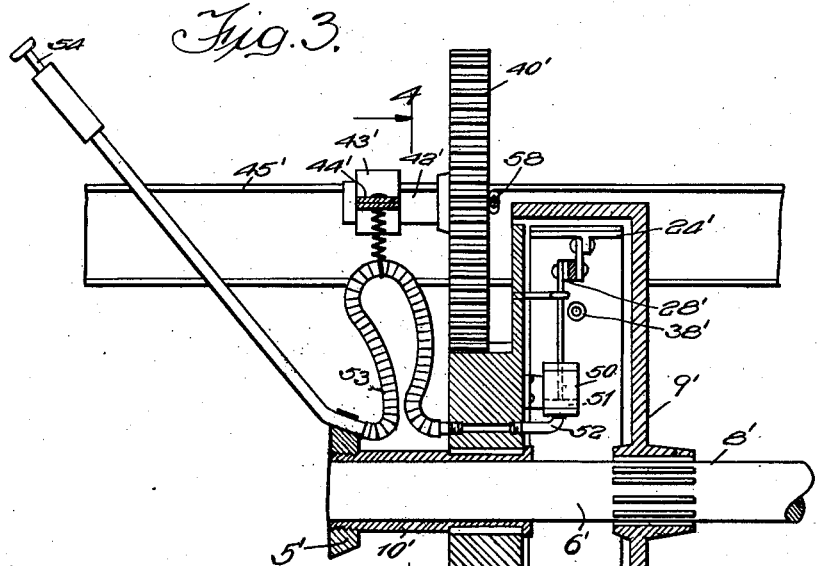

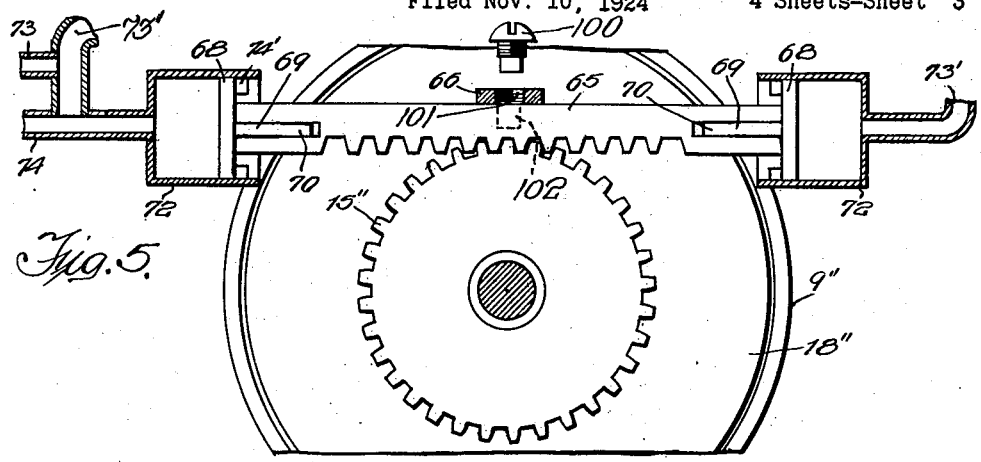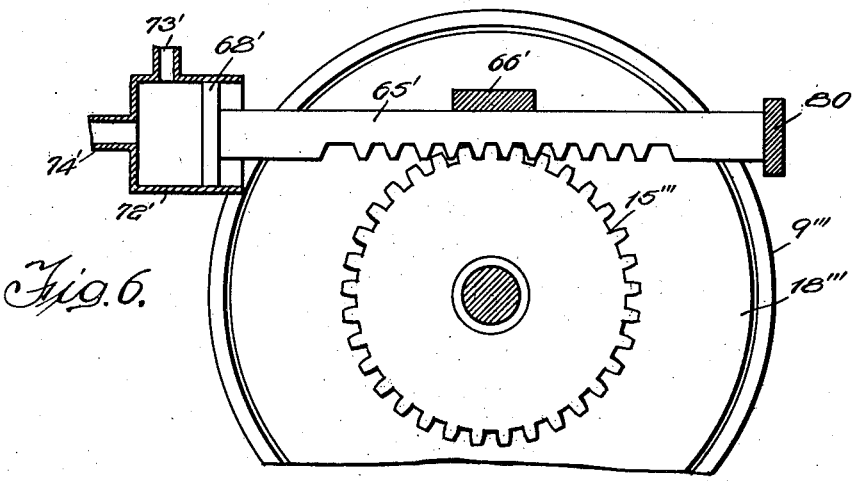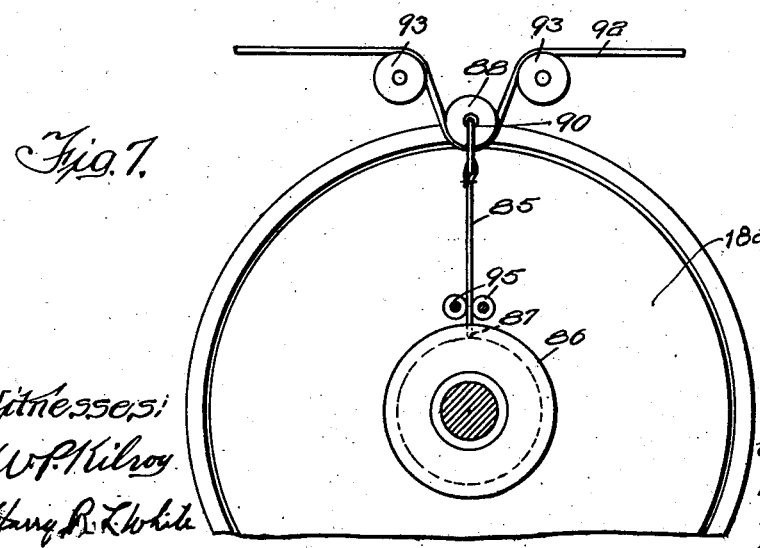

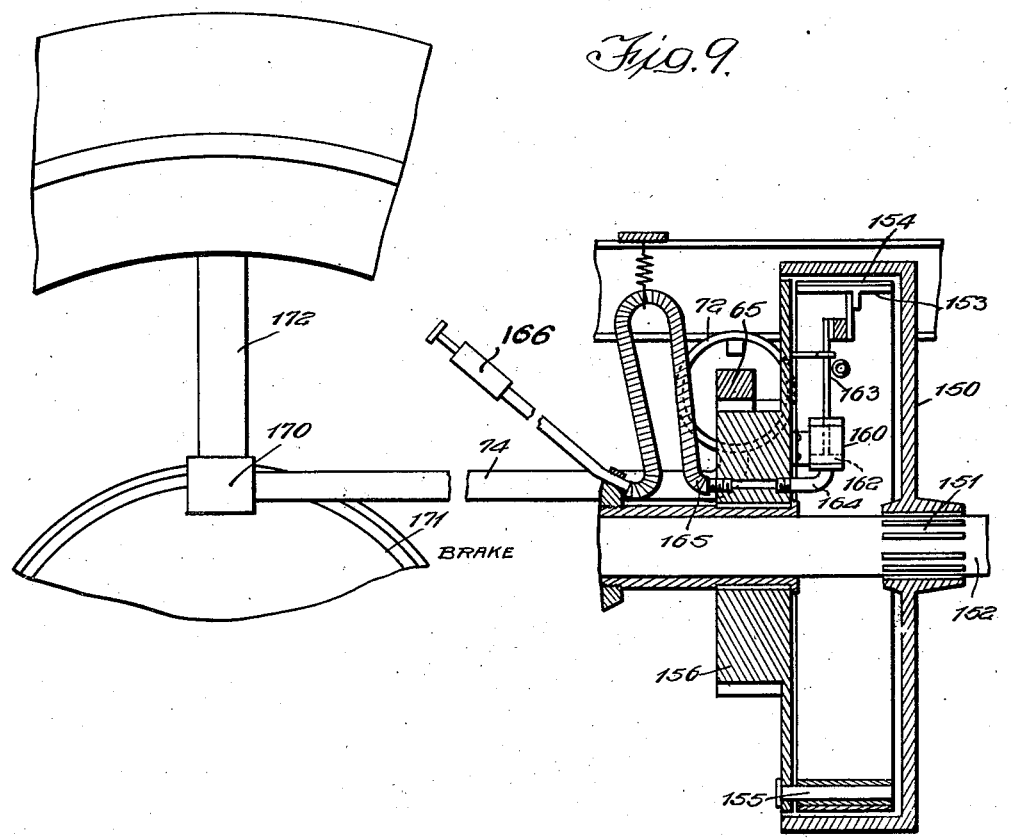

Patented Apr. 26, 1932

1,855,504

UNITED STATES PATENT OFFICE

WILLIAM W. WHITE, OF EVANSTON, ILLINOIS, ASSIGNOR TO BENDIX BRAKE COMPANY, OF CHICAGO, ILLINOIS, A CORPORATION OF ILLINOIS

BRAKE MEANS

Application filed November 10, 1924. Serial No. 748,824.

My invention relates to brake means, more particularly for motor vehicles and the like and it contemplates a generally improved, simplified and inexpensive mechanism for utilizing the driving effort for imparting the braking force positively in either direction of movement of the vehicle.

To acquaint those skilled in the art with the construction and manner of practicing and carrying out my invention, I shall now describe in connection with the accompanying drawings, certain embodiments thereof.

In the drawings:

Fig. 3 is a longitudinal section of another embodiment taken substantially on the line 3—3 of Fig. 4;

Fig. 4 is a vertical transverse section on line 4—4 of Fig. 3;

Fig. 5 is a vertical transverse section through the drive or propeller shaft showing another embodiment of the invention;

Fig. 6 is a view similar to Fig. 5 showing another embodiment;

Fig. 7 is a similar view showing a still further embodiment;

Fig. 8 is a skeleton plan view of a running gear of an automobile, illustrating in a diagrammatical way the application of my invention thereto; and Fig. 9 is a view similar to Fig. 3 illustrating the brake operator of Fig. 5 in combination with the mechanism of Fig. 3 for connecting the device to the propeller shaft, also diagrammatically the connection between the brake operator and a wheel brake, the one shown being illustrative of any one or combination of wheel brakes.

Figure 1:
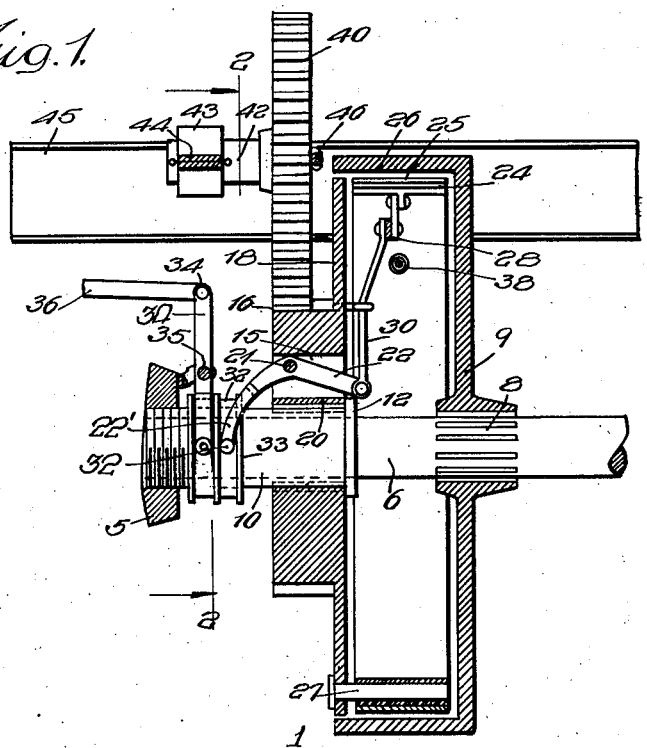
Fig. 1 is a longitudinal section, partially in elevation and taken on the line 1—1 of Fig. 2.
Figure 2:
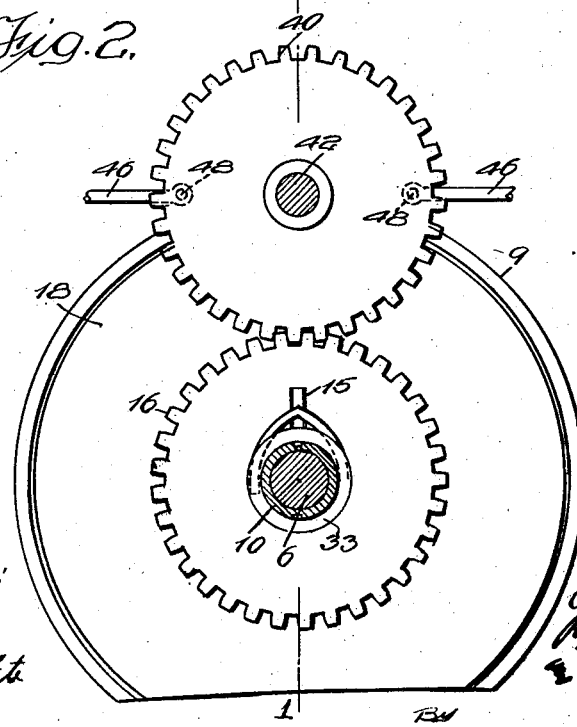
Fig. 2 is a vertical transverse section on line 2—2 of Fig. 1.

In Figs. 1 and 2 the reference character 5 designates fragmentarily a typical or ordinary change speed transmission and 6 the drive or propeller shaft which projects therefrom and through which the driving effort is transmitted to the rear wheels, for example, it being understood that the drive or propeller shaft may have the usual universal or universals, as well understood in the art.

Splined at 8 upon the shaft 6, to rotate therewith, is a brake drum 9. A sleeve 10 loosely surrounds the shaft 6. This sleeve 10 may have an annular flange or shoulder 12 at one end and is mounted at its opposite end as by threading into the housing for the transmission 5.

Loosely mounted upon the sleeve 10, for free rotation thereabout, is a gear member 15 having external teeth 16 and a radially projecting wall 18 which lies along the open end of drum 9 for a purpose which will hereinafter appear. The gear member 15 has a longitudinal slot or opening 20 therethrough and pivoted at 21 in this opening is a bell crank lever 22, the arm 22' of which may be forked as shown.

The particular brake element shown for connecting the gear member 15 for rotation with the shaft 8 is of the internal expanding band type but this may be widely varied within the scope of my present invention. The internal band is shown at 24 and it may have the usual friction face 25 for co-operation with the internal surface 26 of the drum 9. The clearance pin or post 27, which usually supports and maintains the proper clearance of the band between its opposite ends, is secured at its outer end in the radial wall 18 of the gear member 15 and connects the gear member 15 and brake 24 for rotation together.

Toggle linkage means 28 is shown for expanding the brake 24 into braking engagement with the drum 9, and this toggle linkage 28 is connected as by means of a connecting link 30 with the inner arm of the bell crank lever 22. The other arm 22' of the lever 22 has a roller 32 which operates in the external annular groove in a shifting collar 33. The collar 33 is mounted for free longitudinal shifting movement on the sleeve 10, and for shifting the same, a shifting fork 34 is provided. The fork 34 is pivoted at 35 as upon a lug projecting from the transmission housing and may be rocked through a rod 36 which may be actuated by means of a foot pedal or hand lever adjacent the driver's seat, or by power or in any other suitable or preferred manner. The brake 24 may be normally held contracted out of braking engagement with the drum by a spring 38, connected across its free ends, and the operating connections may be held in and returned to non-braking position by the usual spring means (not shown) associated with the hand lever, foot pedal or other operating means.

From the foregoing, it will now be apparent that with the parts in the relative positions shown in Fig. 1, the shaft 8 will rotate to drive the vehicle free of or without turning the gear member 15. When the hand or foot lever, or other controlling means, is operated to rock the fork 34 in the direction to shift the collar 33 rearwardly, the bell crank lever 22 will be rocked in a counter-clockwise direction by said rearward shifting movement of the collar and will operate the toggle linkage 28 through the connecting link 30 to expand the brake 24 into braking engagement with the surface 26 of the drum 9. The braking engagement of the brake 24 with the drum 9 connects the brake 24 and connected parts, which are free to turn, to the drum for rotation therewith, so that thereupon, the brake 24 is turned or rotated with the shaft 8 and said brake 24, being carried by the gear member 15, turns or rotates said gear member 15 with the shaft 8 through the clearance post 27 and such other connection or connections as there may be between the brake and gear member. When the controlling means is released, the parts again assume their normal non-braking positions, as shown in Fig. 1, and the brake 24 is contracted out of braking engagement with the drum by the spring 38.

I provide for utilizing the rotative effort of the gear member 15 for applying a braking force in addition to that imposed on the rear wheels through the propeller shaft brake, as follows. A gear 40, in constant meshing engagement with the teeth 16 of gear member 15, is mounted upon a relatively short shaft or spindle 42 rotatably journalled in a bearing 43, carried by a cross member 44 which may in turn be mounted upon the main side frames or sills 45 of the vehicle chassis or upon a sub-frame, or in any other suitable manner. The brake rods 46 connect the gear 40 with brakes at the wheels, preferably at the front wheels, the lateral pull of rods 46 being converted into a longitudinal pull through longitudinal brake rods as by means of bell crank levers or otherwise. Two rods 46 are shown, but one divided, or with a plurality of connections therefrom, beyond the gear 40, may be employed. The rods 46 are pivotally connected at 48, as through suitable eyed ends to the gear member 40 at diametrically opposite points. The pivotal connections 48 are preferably to the face of gear member 40 opposite that from which shaft 42 extends and sufficient clearance is preferably provided for rods 46, so that a pull will be exerted on rods 46 through substantially one-half a revolution of gear member 40. Relatively great movement of the wheel brake application means is thereby permitted to allow as complete an application of said brakes as desired, at all times. When the parts are in normal non-braking position, as shown, the pivotal connections 48 preferably lie in a horizontal plane through the axis of the gear 40, so that they will be drawn or pulled, in either direction of rotation of the gear 40. When the brake 24 is applied to connect the gear member 15 for rotation with the shaft 8, the gear 40 will be rotated thereby, irrespective of the direction of rotation of the shaft 8 and the rod or rods 46 will be pulled to apply the wheel brakes at the wheels, whether the vehicle be moving forwardly or backwardly. In operation, the propeller shaft brake, brakes the rear wheels as well understood in the art.

The utilization of the reactionary effort developed in braking the rear wheels for applying the braking effort to the front wheels, makes the braking effort applied to the front wheels a function of the braking effort applied to the rear wheels. This provides, in effect, a governed application of the front wheel braking effort and avoids the possibility of skidding the front wheels or appreciable interference with the steering thereof.

In the forward movement of the vehicle, the braking application shifts the effective location of the center of gravity forwardly, so that a greater weight is effective on the front wheels than on the rear wheels. With the rear wheels rotating and constantly presenting new friction surfaces to the road, a continuously increasing retardation may be imposed thereon up to the point which corresponds to a substantially locked condition of the rear wheels, with a sliding or skidding contact between them and the road surface. When this skidding or sliding point is reached, no increase in retardation can be gained through the rear wheels. There will be no increase in reactionary effort transmitted to the front wheels. Because of the greater weight upon the front wheels, a greater braking retardation may be applied to said front wheels before they will slip or skid and the front braking effort being a function of the braking effort applied to the rear wheels, skidding or locking of the front wheels is effectively prevented. The effort transmitting leverages and brakes themselves may, of course, be variously proportioned to vary the relative braking applications as desired.

When rolling backward the presence of the front wheel brakes reduces the braking retardation which must be imposed on the rear wheels and thereby reduces the tendency of back-tipping. Forward tipping is prevented because the instant the rear wheels leave the road there is no more drag on the propeller shaft and consequently substantially no further braking application on the front wheels.

The structural provisions which I have made for attaining the foregoing are exceedingly simple, compact and inexpensive and they form an important aspect of my present invention. The gear member 15 and the meshing engagement therewith of the member through which the braking effort is transmitted from the propeller shaft brake to the front wheels, for example, is positive and has great structural strength. The loss in transmission is exceedingly low and there is no appreciable wear or slippage to be compensated for.

In the embodiment shown in Figs. 3 and 4, the brake drum 9' is similarly mounted upon the shaft 8' for rotation therewith and for convenience of illustration, I have shown the brake 24' similarly arranged within the drum and carried by the radially projecting wall of the gear member 15', which gear member is, as before, mounted loosely for free rotation upon the sleeve 10'. In this case, however, a fluid cylinder 50 is mounted upon the gear member 15', and has therein a reciprocable piston 51 connected with the toggle linkage 28' to operate same and expand the brake 24' into braking engagement with the drum 9' when the piston 51 is forced outwardly. The tube 52 opening into the opposite end of the cylinder 50 leads out through the gear member 15' and is connected to a flexible tube 54, provided with a foot, hand, or other suitably operated plunger 54 and the cylinder 50 and line leading thereto containing or being filled with a preferably non-compressible fluid, such as oil, which forms a fluid connection between the plunger 54 and the piston 51 so that when the plunger 54 is depressed, the toggle 28' will be operated hydraulically to apply the brake 24' and connect the shaft 8' and gear member 15' for rotation together. A suitable replenishing source may be provided for the oil line, and the flexible conduit 53 is provided with sufficient play to permit that rotation of the end of the conduit, which is connected to the tube 52, about the propeller shaft in the application of the brake.

Upon connecting the gear member 15' for rotation with the shaft 8', the gear 40' is rotated as before. In this case, however, instead of the mechanical connection from the gear 40' to the brakes at the wheels, a rod 58 is pivotally connected at 59 to the gear 40', and this rod 58 has at its free or opposite end a piston 60 operable reciprocably in a fluid cylinder 62. The cylinder 62 may conveniently be supported by the cross or frame member which supports the bearing for the gear 40' and the pivotal connection 59 is preferably disposed diametrically opposite across the gear 40' from the position of the cylinder 62 to lie in a horizontal plane thru the axis of the gear 40', so that upon rotation of said gear in either direction, the piston 60 will be pushed or forced outwardly in its cylinder 62. The cylinder 62 has an outlet 64 which leads to the brake means at the wheels and applies same hydraulically.

The means which I have provided lends itself admirably to either a mechanical combination as shown in Figs. 1 and 2, or to a fluid or hydraulic combination as shown in Figs. 3 and 4. Also, the mechanical application means for the propeller shaft brake may be conveniently combined with the hydraulic application means for the brakes at the wheels or the mechanical application means for the brakes at the wheels may be combined with the hydraulic application means for the propeller shaft brake.

In Fig. 5, instead of the gear 40 for imparting the rotative effort of the gear member 15 to the brake-operating means at the wheels, I provide a rack 65 having teeth meshing with the teeth of the gear 15''. As diagrammatically illustrated, guide 66 holds the rack 65 in mesh with the gear 15''. At each end of the rack 65 is a piston 68. Each piston 68 has sliding or free connection with the adjacent end of rack 65 to be actuated or moved positively by the rack in one direction and permit movement of the rack in the opposite direction without positively moving the same. This may be conveniently done by forming stems 69 on the pistons and engaging said stems in suitable longitudinal slots 70 in the ends of the rack 65.

Each piston 68 operates reciprocably in a cylinder 72 and these cylinders may be suitably mounted upon a frame or cross member carried by the vehicle chassis. The cylinders 72 are connected together by a fluid conduit 73', and 74 designates the outlet or line which leads to the wheel brakes, a replenishing inlet being shown at 73. The outward movement of the pistons may be limited by suitable stops 74'. When the gear member 15' is turned in a clockwise direction in the movement of the vehicle in one direction, the rack 65 will be moved to the right operating the wheel brakes through the right hand piston 68, and when the vehicle is traveling in the opposite direction, the wheel brakes will be operated through the left hand piston 68, the rack having movement relative the right hand piston at such time, and the right hand piston being moved back to its normal position by the return of the fluid to its normal non-braking condition in the right hand cylinder 72.

In the embodiment shown in Fig. 6, the rack 65 is provided at one end only with a piston 65'. In one direction of movement, preferably forward the rack 65' operates the piston 68' to apply the wheel brakes hydraulically, while in the opposite direction of movement of the vehicle, the rack 65' engages a stop 80, whereupon complete braking effort upon the propeller shaft brake may be produced to brake the rear wheels, the propeller shaft brake functioning alone at this time.

In the embodiment shown in Fig. 7, the rotative effort of the member 18a, which is analogous to the gear member 18 of Fig. 1, is transmitted to the wheel brakes through a flexible element 85. The gear member 18a carries co-axially therewith a sprocket or sheave 86 and the flexible element 85, which may conveniently be a chain of suitable proportions, is anchored at 87 to the periphery of this sprocket or sheave 86 and is adapted to be wrapped about the periphery thereof upon rotation of the sheave or sprocket as a unit with member 18a. Secured upon the opposite end of the flexible member 85 is a sheave 88 which operates in a bight 90 of a flexible equalizing element 92 trained over idlers 93 and connected with the wheel brake operating means to operate same as the point of anchorage 87 is lowered in either direction of rotation of gear member 18a. When flexible element 85 is a chain and it co-operates with a sprocket, the meshing engagement will hold the chain against slipping off laterally. Where a cable, for example, is employed, in combination with a sheave member, the sheave may be grooved or flanged for the same purpose. Adjacent the periphery of gear member 18a, the flexible transmitting element 85 operates between a pair of idlers 95.

In the embodiments of Figures 5 and 6, the stop or limiting means for the pistons, obviously limits the turning action of the gear member 15'', so that in case the front brakes are not properly brought into action, because of a loss of liquid, an emergency stop will take effect.

Where the liquid becomes ineffective, however, the play or movement of the pistons with the accompanying time interval in bringing the propeller shaft brake positively into action may be undesirable. To overcome this I provide means, shown for purposes of illustration in the form of a pin or screw 100 for anchoring the rack 65 against movement, so that the propeller brake will be positively brought into action without any lost motion. The screw 100 is shown as adapted for threading through a tapped opening 101 in relatively stationary guide 66 and as having a projecting end for engagement in an opening 102 in rack 65.

The other embodiments may be similarly provided with emergency stops for stopping the action of the "Servo" mechanism and making the braking effort a positive braking application on the propeller shaft. The connection of the brake operator to the drive or propeller shaft in the embodiment shown in Fig. 9 is substantially the same as described in connection with Fig. 3. The brake drum 150 is splined at 151 upon the shaft 152 for rotation therewith. The shaft 152 may constitute the drive or propeller shaft of the vehicle as before. While the type of brake is, of course, subject to wide variations, the one shown is of the internal expanding band type, the internal band being shown at 153 and it may have the usual friction face 154 for cooperation with the internal surface of the drum. The clearance pin or post 155 may be mounted in the radial wall of the gear member 156, as before, which gear member is, as before, mounted loosely for free rotation.

The fluid cylinder 160 is mounted upon the gear member 156 and has operating therein a reciprocable piston 162 connected with the toggle linkage 163 to operate same and expand the brake into braking engagement with the drum 150 when the piston is forced outwardly. The tube 164 opening into the opposite end of the cylinder 160 leads out through the gear member and is connected to a flexible tube 165 provided with a foot, hand, or other suitable manually operated plunger means 166, the cylinder 160 and line leading therethrough containing or being filled with a preferably non-compressible fluid, such as oil, which forms a fluid connection between the operating member 166 and the piston 162, so that when the plunger or member 166 is operated, the toggle 163 will be operated hydraulically to apply the brake 153 and connect the propeller shaft and gear member 156 for rotation together.

The brake operator including the rack and its associated pistons is identical with that shown in Fig. 5, and the description and reference characters applied to that figure may be taken as applied here. The line 74, which as previously described designates the outlet line leading to the wheel brakes, is shown as being continued in this figure and a wheel brake operating means 170 for operating the brake 171 of the wheel 172 is shown more or less diagrammatically in conjunction therewith.

I claim:

1. Brake-applying means for use on a vehicle comprising, in combination, a power-driven shaft, a gear frictionally driven by said shaft, a rack geared to said gear and driven thereby in opposite directions according to the direction of vehicle movement, and brake-applying means operative to transmit brake-applying pressure from said rack in the same direction in either direction said rack is driven.

2. A vehicle having a brake and a drive shaft, and comprising, in combination therewith, a brake operated by said shaft, two master fluid cylinders adjacent the shaft and connected to the first mentioned brake, and a piston in each cylinder operated by the second mentioned brake, one piston being operated by said latter brake when the vehicle is moving forward and the other when it is moving backward.

3. A vehicle having brakes and a drive shaft, and comprising, in combination therewith, friction means operated by said shaft, two master fluid cylinders adjacent the shaft and connected to the friction means, a power piston in each cylinder, and a one way operating connection from each piston to the friction means.

4. A vehicle having brakes and a drive shaft, and comprising, in combination therewith, brake-applying means including a power cylinder, a gear frictionally driven by said shaft, and a piston in the cylinder geared to said frictionally driven gear, together with means for holding the piston against movement in an emergency to cause braking through the shaft.

5. A vehicle having brakes and a drive shaft, and comprising, in combination therewith, brake-applying means including a power cylinder, a gear frictionally driven by said shaft, a piston in the cylinder, and a rack operating the piston and meshing with said frictionally driven gear, together with means for holding the rack against movement in an emergency to cause braking through the shaft.

6. Brake-applying means for use on a vehicle, comprising, in combination, a power driven shaft, a part frictionally driven by said shaft, a single member geared to said part and driven thereby in opposite directions according to the direction of vehicle movement, and brake-applying means operative to submit brake-applying pressure from said member in one direction only and irrespective of the direction said member is driven.

7. A vehicle having road wheels with brakes and power transmission mechanism driving the vehicle, and comprising in combination therewith, friction means controlled by the driver and driven by the transmission mechanism in opposite directions according to the direction of vehicle movement, a gear member driven by said friction means, a rack geared to said gear member and driven thereby in opposite directions, together with a fluid motor at each end of the rack, the movable element of each motor disconnectedly engaging the corresponding end of the rack whereby one of said motors is energized when the rack operates in one direction and the other of said motors is energized when the rack is operated in the other direction.

8. A vehicle having road wheels with brakes and a power driven shaft driving the vehicle, and comprising in combination therewith, friction means controlled by the driver and driven by said shaft in opposite directions according to the direction of vehicle movement, a gear member driven by said friction means, a rack geared to said gear member and driven thereby in opposite directions, together with a fluid motor at each end of the rack, a piston in each motor and a connecting rod secured to each piston, each of said pistons having its connecting rod bifurcated to slidingly receive one end of the rack whereby one of said motors is energized when the rack operates in one direction and the other of said motors in energized when the rack is operated in the other direction.

In witness whereof, I hereunto subscribe my name this 4th day of November, 1924.

WILLIAM W. WHITE.